US011208107B2

(12) United States Patent
Urano et al.

(10) Patent No.: US 11,208,107 B2
(45) Date of Patent: Dec. 28, 2021

(54) SYSTEMS AND METHODS FOR SELECTING AMONG DIFFERENT DRIVING MODES FOR AUTONOMOUS DRIVING OF A VEHICLE

(71) Applicant: Toyota Research Institute, Inc., Los Altos, CA (US)

(72) Inventors: Hiromitsu Urano, Ann Arbor, MI (US); Kentaro Ichikawa, Ann Arbor, MI (US); Junya Ueno, Ann Arbor, MI (US)

(73) Assignee: Toyota Research Institute, Inc., Los Altos, CA (US)

( * ) Notice: Subject to any disclaimer, the term of this patent is extended or adjusted under 35 U.S.C. 154(b) by 278 days.

(21) Appl. No.: 16/199,999

(22) Filed: Nov. 26, 2018

(65) Prior Publication Data
US 2020/0164877 A1 May 28, 2020

(51) Int. Cl.
*B60W 30/182* (2020.01)
*B60W 30/16* (2020.01)
*B60W 50/08* (2020.01)
*G05D 1/00* (2006.01)
*G05D 1/02* (2020.01)
*G06K 9/00* (2006.01)

(52) U.S. Cl.
CPC ........ *B60W 30/182* (2013.01); *B60W 30/162* (2013.01); *B60W 50/082* (2013.01); *G05D 1/0088* (2013.01); *G05D 1/0223* (2013.01); *G06K 9/00838* (2013.01); *B60W 2554/801* (2020.02); *B60W 2556/65* (2020.02); *G05D 2201/0213* (2013.01)

(58) Field of Classification Search
CPC ............. B60W 30/182; B60W 50/082; B60W 30/162; B60W 2554/801; B60W 2556/65; B60W 50/00; B60W 2050/007; G05D 1/0088; G05D 1/0223; G05D 2201/0213; G05D 1/0061; G06K 9/00838; G06K 9/00791
See application file for complete search history.

(56) References Cited

U.S. PATENT DOCUMENTS

| 4,554,493 | A | 11/1985 | Armstrong |
| 7,202,776 | B2 | 4/2007 | Breed |
| 8,457,827 | B1 | 6/2013 | Ferguson |

(Continued)

FOREIGN PATENT DOCUMENTS

| DE | 102012021282 | 4/2014 |
| DE | 102015110903 | 1/2016 |

(Continued)

*Primary Examiner* — Nga X Nguyen
(74) *Attorney, Agent, or Firm* — Sheppard, Mullin, Richter & Hampton LLP; Daniel N. Yannuzzi; Hector A. Agdeppa

(57) ABSTRACT

Systems and methods for selecting among different driving modes for autonomous driving of a vehicle may: generate output signals; determine the vehicle proximity information that indicates whether one or more vehicles are within the particular proximity of the vehicle; determine the internal passenger presence information that indicates whether one or more passengers are present in the vehicle; select a first driving mode or a second driving mode based on one or more determinations; and control the vehicle autonomously in accordance with the selection of either the first driving mode or the second driving mode.

20 Claims, 3 Drawing Sheets

(56) References Cited

U.S. PATENT DOCUMENTS

| | | | |
|---|---|---|---|
| 8,825,258 B2 | 9/2014 | Cullinane | |
| 8,849,494 B1 | 9/2014 | Herbach | |
| 8,880,270 B1 | 11/2014 | Ferguson | |
| 9,587,952 B1 | 3/2017 | Slusar | |
| 9,950,708 B1* | 4/2018 | Cullinane | B60W 30/095 |
| 9,969,396 B2 | 5/2018 | Damman | |
| 10,029,684 B2* | 7/2018 | Schuberth | B60W 50/0097 |
| 2014/0236414 A1 | 8/2014 | Droz | |
| 2015/0149017 A1 | 5/2015 | Attard | |
| 2015/0168174 A1* | 6/2015 | Abramson | G01C 21/3626 |
| | | | 701/408 |
| 2015/0203107 A1 | 7/2015 | Lippman | |
| 2015/0339928 A1 | 11/2015 | Ramanujam | |
| 2016/0026182 A1 | 1/2016 | Boroditsky | |
| 2017/0192437 A1 | 7/2017 | Bier | |
| 2018/0039917 A1 | 2/2018 | Buttolo | |
| 2018/0056982 A1* | 3/2018 | Endo | B60W 10/18 |
| 2019/0111925 A1* | 4/2019 | Sata | B60W 10/10 |
| 2020/0064839 A1* | 2/2020 | Oyama | B60W 60/00182 |

FOREIGN PATENT DOCUMENTS

| | | | |
|---|---|---|---|
| DE | 102015224033 | 3/2017 | |
| DE | 102016204789 B4 * | 10/2020 | B60W 30/182 |

* cited by examiner

SYSTEMS AND METHODS FOR SELECTING AMONG DIFFERENT DRIVING MODES FOR AUTONOMOUS DRIVING OF A VEHICLE

TECHNICAL FIELD

The disclosed technology relates generally to systems and methods for selecting among different driving modes for autonomous driving of a vehicle.

DESCRIPTION OF RELATED ART

Vehicles may operate in one or both of a manual driving mode and an autonomous driving mode. Some vehicles may offer a selection of different driving modes to the vehicle operator.

BRIEF SUMMARY OF EMBODIMENTS

One aspect of the present disclosure relates to a system and/or vehicle configured for selecting among different driving modes for autonomous driving of the vehicle. The vehicle may include a set of sensors, one or more hardware processors, and/or other components. The set of sensors may be configured to generate output signals. The output signals may convey vehicle proximity information, internal passenger presence information, and/or other information. The vehicle proximity information may indicate whether one or more vehicles are within a particular proximity of the vehicle. The internal passenger presence information may indicate whether one or more passengers are present in the vehicle. The processor(s) may be configured by machine-readable instructions. The processor(s) may be configured to determine the vehicle proximity information that indicates whether one or more vehicles are within the particular proximity of the vehicle. Determination of the vehicle proximity information may be based on the output signals. The processor(s) may be configured to determine the internal passenger presence information that indicates whether one or more passengers are present in the vehicle. Determination of the internal passenger presence information may be based on the output signals. The processor(s) may be configured to select a first driving mode. Selecting the first driving mode may be responsive to one or more indications, e.g., from determined information. In some implementations, selection may be responsive to the vehicle proximity information indicating no vehicles are within the particular proximity of the vehicle. Alternatively, and/or simultaneously, selection may be responsive to the internal passenger presence information indicating no passengers are present in the vehicle. The processor(s) may be configured to select a second driving mode. Selecting the second driving mode may be responsive to one or more of the vehicle proximity information indicating one or more vehicles are within the particular proximity of the vehicle, or the internal passenger presence information indicating one or more passengers are present in the vehicle. The first driving mode may be different than the second driving mode. The first driving mode may be more energy-efficient than the second driving mode and/or the first driving mode may save driving time compared to the second driving mode. The processor(s) may be configured to control the vehicle autonomously in accordance with the selection of either the first driving mode or the second driving mode.

Another aspect of the present disclosure relates to a method for selecting among different driving modes for autonomous driving of a vehicle. The method may include generating output signals. The output signals may convey vehicle proximity information, internal passenger presence information, and/or other information. The vehicle proximity information may indicate whether one or more vehicles are within a particular proximity of the vehicle. The internal passenger presence information may indicate whether one or more passengers are present in the vehicle. The method may include determining the vehicle proximity information that indicates whether one or more vehicles are within the particular proximity of the vehicle. Determination of the vehicle proximity information may be based on the output signals. The method may include determining the internal passenger presence information that indicates whether one or more passengers are present in the vehicle. Determination of the internal passenger presence information may be based on the output signals. The method may include selecting a first driving mode. Selecting the first driving mode may be responsive to one or more indications, e.g., from determined information. In some implementations, selection may be responsive to the vehicle proximity information indicating no vehicles are within the particular proximity of the vehicle. Alternatively, and/or simultaneously, selection may be responsive to the internal passenger presence information indicating no passengers are present in the vehicle. The method may include selecting a second driving mode. Selecting the second driving mode may be responsive to one or more of the vehicle proximity information indicating one or more vehicles are within the particular proximity of the vehicle, or the internal passenger presence information indicating one or more passengers are present in the vehicle. The first driving mode may be different than the second driving mode. The first driving mode may be more energy-efficient than the second driving mode and/or the first driving mode may save driving time compared to the second driving mode. The method may include controlling the vehicle autonomously in accordance with the selection of either the first driving mode or the second driving mode.

As used herein, any association (or relation, or reflection, or indication, or correspondency) involving servers, processors, client computing platforms, vehicles, sensors, output signals, driving modes, passengers, and/or another entity or object that interacts with any part of the vehicle and/or plays a part in the operation of the vehicle, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying figures, all of which form a part of this specification, wherein like reference numerals designate corresponding parts in the various figures. It is to be expressly understood, however, that the figures are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The technology disclosed herein, in accordance with one or more various implementations, is described in detail with reference to the following figures. The figures are provided for purposes of illustration only and merely depict typical or example implementations of the disclosed technology. These figures are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Vehicles capable of driving autonomously may use different driving modes to save time or energy. Different driving modes may be selected based on different determinations regarding the number of passengers in an autonomous vehicle, the number of nearby vehicles, the number of passengers in nearby vehicles, the driving modes of nearby vehicles, and/or other determinations, as well as combinations of multiple determinations. In some implementations, a passenger may request and/or select a particular driving mode, e.g., to save time or energy.

Figure 1:
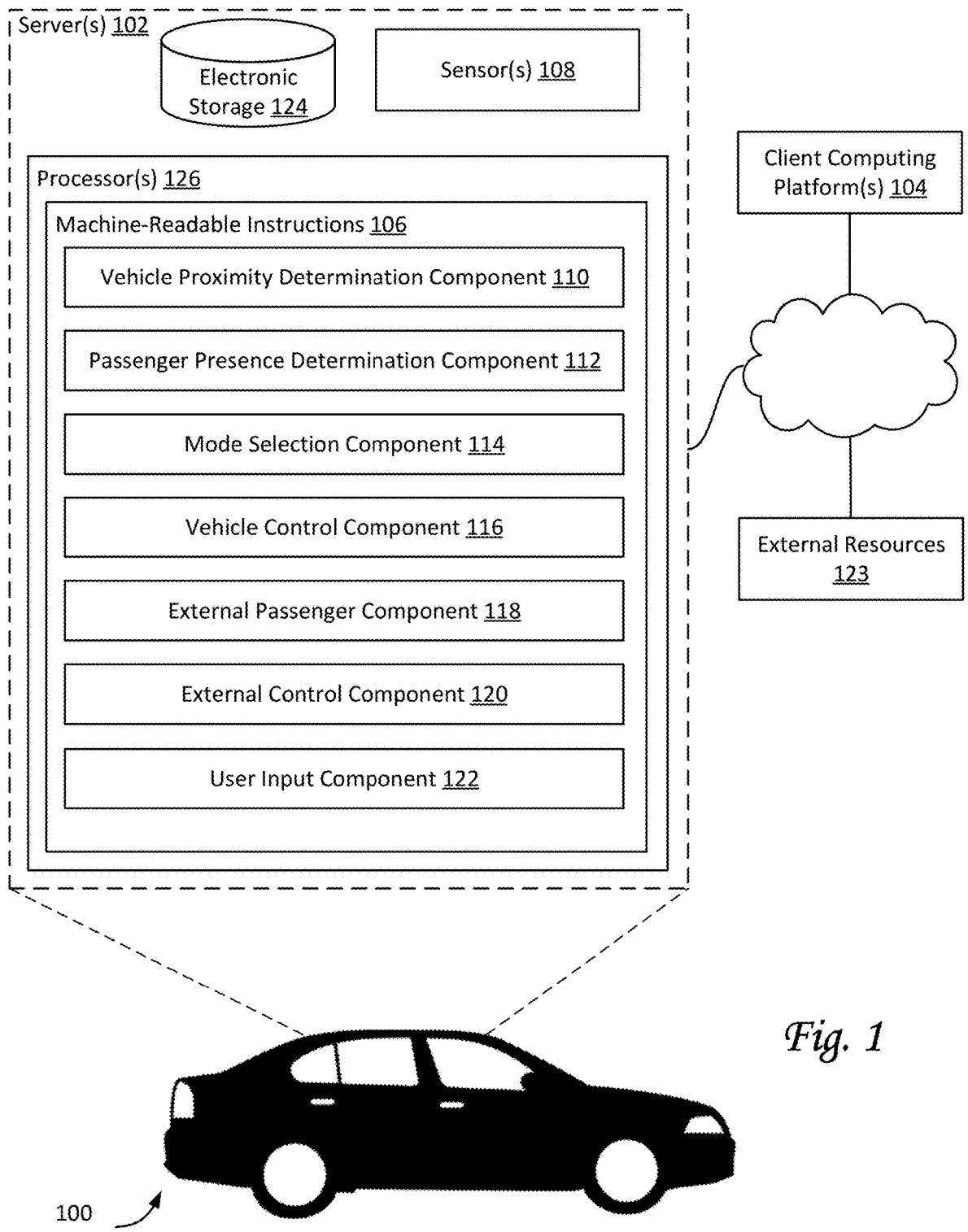
FIG. 1 shows a vehicle configured for selecting among different driving modes for autonomous driving of the vehicle, in accordance with one or more implementations.

FIG. 1 illustrates a vehicle 100 configured for selecting among different driving modes for autonomous driving of vehicle 100, in accordance with one or more implementations. In some implementations, different driving modes may save, by way of non-limiting example, time and/or energy in operating vehicle 100. In some implementations, considerations regarding passenger comfort pertaining to the selection of a driving mode may be assuaged if no passengers are present in vehicle 100. In other words, the comfort of a passenger is not a concern if vehicle 100 has no passengers. In some implementations, considerations regarding passenger comfort pertaining to the selection of a driving mode may be disregarded upon request by a passenger. Alternatively, and/or simultaneously, in some implementations, considerations regarding passenger comfort pertaining to the selection of a driving mode may be assuaged if no other vehicles are near vehicle 100. In other words, the comfort of passengers in other vehicles is not a concern if no other vehicles are near vehicle 100. In some implementations, the comfort of passengers in other vehicles may be of reduced concern if those other vehicles are being controlled autonomously. In some implementations, autonomous operation of vehicle 100 may include operation at L2, L3, or higher.

In some implementations, vehicle 100 may include one or more servers 102, one or more processors 126, one or more sensors 108, electronic storage 124, and/or other components. Vehicle 100 may be configured to communicate with one or more other vehicles and/or client computing platforms 104 according to a client/server architecture, a peer-to-peer architecture, and/or other architectures.

Sensors 108 may be configured to generate output signals conveying information. In some implementations, the information may be related to the operation of one or more vehicles. In some implementations, the information may include one or more of vehicle proximity information, pedestrian proximity information, bicycle proximity information, proximity information, internal passenger presence information, external passenger presence information, external control information, visual information, motion-related information, position-related information, biometric information, and/or other information. In some implementations, vehicle proximity information may indicate whether one or more vehicles are within a particular proximity of vehicle 100. In some implementations, pedestrian proximity information may indicate whether one or more pedestrians are within a particular proximity of vehicle 100. In some implementations, bicycle proximity information may indicate whether one or more bicycle are within a particular proximity of vehicle 100. In some implementations, proximity information may indicate whether one or more vehicles, pedestrians, bicycles and/or other road users are within one or more particular proximities of vehicle 100. For example, a particular proximity used for vehicles may be different than a particular proximity for pedestrians. In some implementations, internal passenger presence information may indicate whether one or more passengers are present in vehicle 100. In some implementations, external passenger presence information may indicate whether any passengers are present in one or more vehicles within a particular proximity of vehicle 100. In some implementations, a particular proximity used for determination of external passenger presence information may be different than the proximity used to determine other information, including but not limited to vehicle proximity information, and/or other proximity information. In some implementations, external control information may indicate whether one or more vehicles within a particular proximity of vehicle 100 are currently under autonomous control. Some or all sensors 108 may be carried by an individual vehicle, e.g., vehicle 100.

Information from sensors 108 may include, by way of non-limiting example, timing information, operator information, and/or other information. In some implementations, generated information may be associated with timing information (e.g., from a timer), operator information, and/or other information. In some implementations, timing information may associate and/or otherwise relate the generated output signals with one or more moments of generation by one or more particular sensors. For example, timing information may include time stamps that indicate moments of generation. For example, at a time labeled $t_1$ the speed of a vehicle may be 50 mph, at a time labeled $t_2$ the speed may be 55 mph, and so forth. A set of time stamps or moments in time may form a timeline. In some implementations, the operator information may associate and/or otherwise relate the generated output signals with individual vehicle operators at the moments of generation. For example, a particular sensor may generate a particular output signal conveying a particular operating parameter of an individual vehicle, such as speed and/or another operating parameter. The particular output signal may include and/or be associated with a timestamp (e.g., time=$t_x$) that indicates when the particular output signal was generated. For example, a series of output signals may be associated with a corresponding series of timestamps. In some implementations, the particular output signal may be associated with a particular vehicle operator. For example, the particular output signal may be associated with the particular vehicle operator that was operating the individual vehicle at the time the particular output signal was generated. In some implementations, a set of resources may be configured to store generated information, timing information, operator information, and/or other information, e.g., in electronic storage.

Sensor 108 may be configured to generate output signals conveying information related to the operation and/or one or more operating conditions of vehicle 100. Information related to the operation of vehicle 100 may include feedback information from one or more of the mechanical systems of the vehicle, and/or other information. In some implementations, at least one of sensors 108 may be a vehicle system sensor included in an engine control module (ECM) system or an electronic control module (ECM) system of vehicle 100. In some implementations, one or more sensors may be carried by vehicle 100. The sensors of a particular vehicle may be referred to as a set of sensors. An individual sensor may be vehicle-specific. Individual sensors may be configured to generate output signals conveying information. In some implementations, one or more components of vehicle 100 may determine one or more parameters that are measured, derived, estimated, approximated, and/or otherwise determined based on one or more output signals generated by sensors 108.

Sensors 108 may include, by way of non-limiting example, one or more of an altimeter (e.g. a sonic altimeter, a radar altimeter, and/or other types of altimeters), a barometer, a magnetometer, a pressure sensor (e.g. a static pressure sensor, a dynamic pressure sensor, a pitot sensor, etc.), a thermometer, an accelerometer, a gyroscope, an inertial measurement sensor, global positioning system sensors, a tilt sensor, a motion sensor, a vibration sensor, an image sensor, a camera, a depth sensor, a distancing sensor, an ultrasonic sensor, an infrared sensor, a light sensor, a microphone, an air speed sensor, a ground speed sensor, an altitude sensor, medical sensors (including but not limited to blood pressure sensor, pulse oximeter, heart rate sensor, etc.), degree-of-freedom sensors (e.g. 6-DOF and/or 9-DOF sensors), a compass, and/or other sensors. As used herein, the term "motion sensor" may include one or more sensors configured to generate output conveying information related to position, location, distance, motion, movement, acceleration, and/or other motion-based parameters. Output signals generated by individual sensors (and/or information based thereon) may be stored and/or transferred in electronic files. In some implementations, output signals generated by individual sensors (and/or information based thereon) may be streamed to one or more other components of vehicle 100.

Sensors 108 may include image sensors, cameras, and/or other sensors. As used herein, the terms "camera" and/or "image sensor" may include any device that captures images, including but not limited to a single lens-based camera, a camera array, a solid-state camera, a mechanical camera, a digital camera, an image sensor, a depth sensor, a remote sensor, a lidar, an infrared sensor, a (monochrome) complementary metal-oxide-semiconductor (CMOS) sensor, an active pixel sensor, and/or other sensors. Individual sensors may be configured to capture information, including but not limited to visual information, video information, audio information, geolocation information, orientation and/or motion information, depth information, and/or other information. Information captured by one or more sensors may be marked, timestamped, annotated, and/or otherwise processed such that information captured by other sensors can be synchronized, aligned, annotated, and/or otherwise associated therewith. For example, video information captured by an image sensor may be synchronized with information captured by an accelerometer or other sensor. Output signals generated by individual image sensors (and/or information based thereon) may be stored and/or transferred in electronic files.

In some implementations, an image sensor may be integrated with electronic storage, e.g., electronic storage 124, such that captured information may be stored, at least initially, in the integrated embedded storage of a particular vehicle, e.g., vehicle 100. In some implementations, one or more components carried by an individual vehicle may include one or more cameras. For example, a camera may include one or more image sensors and electronic storage media. In some implementations, an image sensor may be configured to transfer captured information to one or more components of the system, including but not limited to remote electronic storage media, e.g. through "the cloud."

Server(s) 102 and/or processor(s) 126 may be configured by machine-readable instructions 106. Machine-readable instructions 106 may include one or more instruction components. The instruction components may include computer program components. The instruction components may include one or more of a vehicle proximity determination component 110, a passenger presence determination component 112, a mode selection component 114, a vehicle control component 116, an external passenger component 118, an external control component 120, a user input component 122, and/or other instruction components.

Vehicle proximity determination component 110 may be configured to determine information regarding objects in the proximity of vehicle 100. In some implementations, vehicle proximity determination component 100 may be configured to determine vehicle proximity information that indicates whether one or more vehicles are within a particular proximity of vehicle 100. Determination of the vehicle proximity information may be based on the output signals. In some implementations, the particular proximity may be fixed or constant. For example, the manufacturer of vehicle 100 may set the particular proximity to 5 m, 10 m, 15 m, 20 m, 25 m, 30 m, 35 m, 40 m, 45 m, 50 m, 60 m, 70 m, 80 m, 90 m, 100 m, and/or another distance from vehicle 100. In some implementations, the particular proximity may be set by a vehicle operator, fleet manager, and/or other stakeholder with an interest in the operations of vehicle 100. In some implementations, the particular proximity may be variable. For example, the particular proximity may change based on one or more of the make and/or model of vehicle 100, road conditions, weather conditions, time-of-day, traffic conditions, vehicle operator preference, and/or other information.

Passenger presence determination component 112 may be configured to determine information regarding passengers within vehicle 100. In some implementations, passenger presence determination component 112 may be configured to determine internal passenger presence information that indicates whether one or more passengers are present in vehicle 100. Determination of the internal passenger presence information may be based on the output signals. In some implementations, internal passenger presence information may be represented by a Boolean value. In some implementations, internal passenger presence information may be a numerical value representing the number of passengers present in vehicle 100. In some implementations, internal passenger presence information may be determined such that only conscious passengers are counted as passengers within vehicle 100.

Mode selection component 114 may be configured to select driving modes. For example, the driving modes may include a first driving mode, a second driving mode, a third driving mode, a fourth driving mode, and/or other driving modes. In some implementations, different driving modes may be mutually exclusive, such that only one driving mode may be currently active and/or used for controlling vehicle 100. In some implementations, selection of the first driving mode may be responsive to the vehicle proximity information indicating no vehicles are within the particular proximity of vehicle 100. In some implementations, selection of the first driving mode may be responsive to the vehicle proximity information indicating no vehicles are within the particular proximity of vehicle 100 and the internal passenger presence information indicating no passengers are present in vehicle 100. In some implementations, selection of the first driving mode may be responsive to the internal passenger presence information indicating no passengers are present in vehicle 100. In some implementations, selection of the first driving mode may be responsive to a combination of two or more determinations regarding vehicle 100 and/or conditions external to vehicle 100. In some implementations, a passenger may request the first driving mode, e.g., to save time or energy. In some implementations, mode selection component 114 may be configured to agree and/or approve a passenger's request, e.g., responsive to the vehicle proximity information indicating no vehicles are within the particular proximity of vehicle 100. For example, a passenger's user input may represent a request for selection of a particular driving mode.

In some implementations, the first driving mode may allow a higher level of (longitudinal and/or lateral) acceleration than a maximum level of acceleration allowed while vehicle 100 is operating in a different driving mode, such as the second driving mode. For example, higher levels of positive acceleration may result in a more energy-efficient operation of vehicle 100, compared to only using lower levels of acceleration. For example, higher levels of positive acceleration may result in reaching a destination faster, compared to only using lower levels of acceleration. However, higher levels of acceleration may reduce a level of comfort of a passenger in vehicle 100. In some implementations, the first driving mode may be more energy-efficient than the second driving mode and/or the first driving mode saves driving time compared to the second driving mode.

In some implementations, the first driving mode may allow a higher level of deceleration than a maximum level of deceleration allowed while vehicle 100 is operating in a different driving mode, such as the second driving mode. For example, higher levels of deceleration may result in reaching a destination faster, compared to only using lower levels of deceleration. However, higher levels of deceleration may reduce a level of comfort of a passenger in vehicle 100.

In some implementations, the first driving mode may allow a smaller following distance to another vehicle than a minimum following distance allowed while the vehicle is operating in a different driving mode, such as the second driving mode. For example, a smaller following distance may result in a more energy-efficient operation of vehicle 100, compared to using a greater (minimum) following distance. For example, a smaller following distance may result in reaching a destination faster, compared to using a greater following distance. However, using a smaller following distance may reduce a level of comfort of a passenger in vehicle 100.

In some implementations, the first driving mode may allow one or more of a reduced or limited use of the brakes, higher speeds, turning corners in a wider radius (to maintain more speed), coasting on downslopes, and/or other types of operation that may help achieve a particular target (such as, by way of non-limiting example, reaching a destination as fast as possible, reaching a destination in an energy-efficient manner, and/or other targets). However, different types of operation may have different consequences for passengers in vehicle 100, or in other vehicles.

Figure 3:
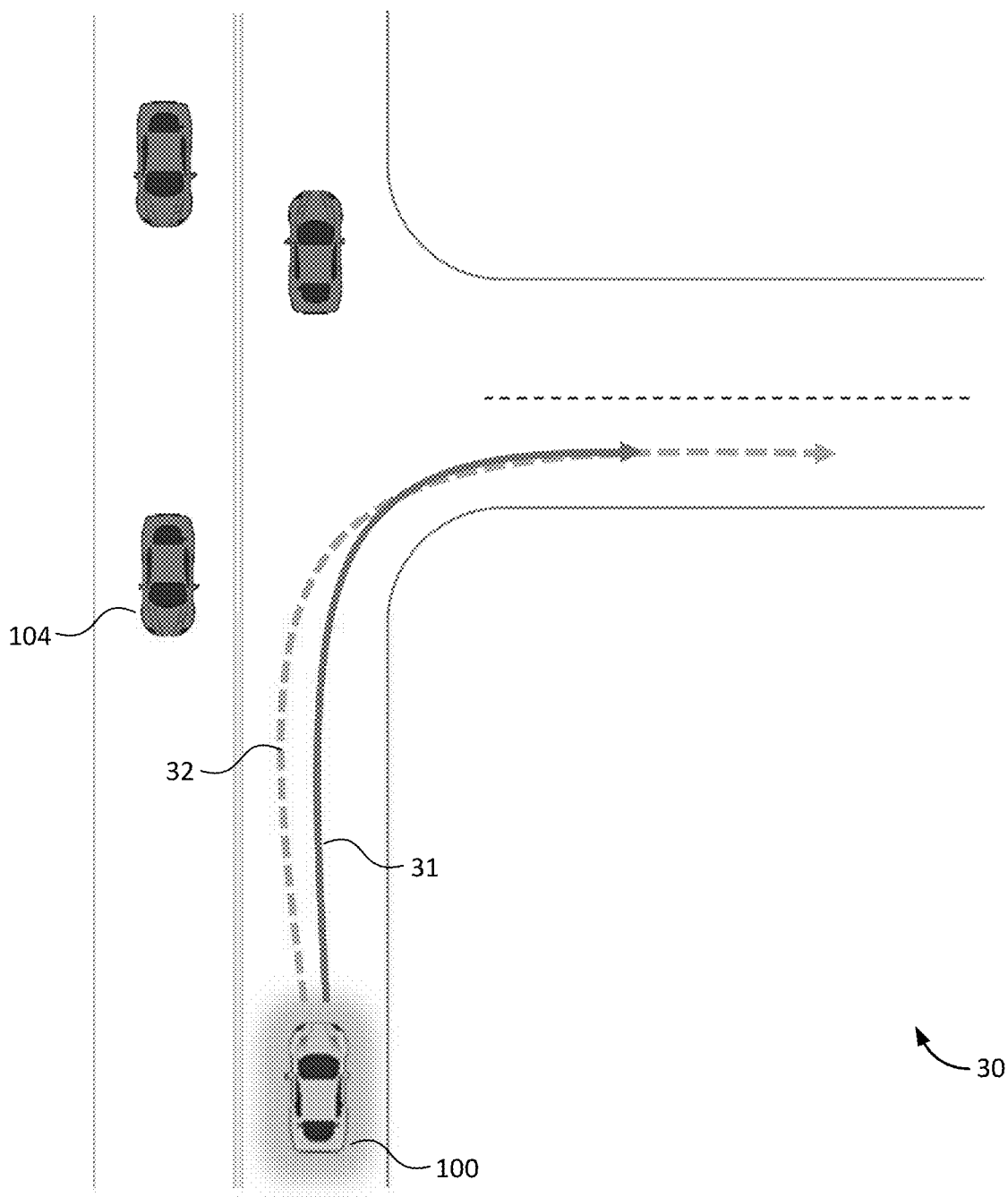
FIG. 3 illustrates a traffic scenario in which a vehicle can select among different driving modes for autonomous driving, in accordance with one or more implementations.

By way of non-limiting example, FIG. 3 illustrates a traffic scenario 30 in which vehicle 100 can select among different driving modes for autonomous driving. For example, a first driving mode may allow turning corners in a wider radius to maintain more speed, as may be indicated by a route 32. For example, a second driving mode may not allow turning corners in a wider radius, and/or may not allow higher speeds during turns, as may be indicated by a route 31. Route 31 and route 32 may be different in terms of energy-efficiency, speeds, and/or other targets for the operation of vehicle 100. In traffic scenario 30, a client computing platform 104 is included, which may be another vehicle. While this vehicle is far enough away from vehicle 100, the first driving mode may be available for selection. As this other vehicle approaches vehicle 100, and is within a particular proximity (e.g., within a minimum distance of, e.g., 50 m, or within a certain period of being close to vehicle 100, e.g., 3 seconds), the first driving mode may be no longer available for selection. In some implementations, the thresholds used for approaching vehicles may depend of the speed of vehicle 100 and/or the speed of the approaching vehicles. As the other vehicle approaches, vehicle 100 may be configured to select a different driving mode, and be controlled in accordance with the different driving mode (e.g., a second driving mode).

Different driving modes may be selected based on different targets for operating vehicle 100. One or more driving modes may be specialized to reach a destination as fast as possible (while legal and/or safe). One or more driving modes may be specialized to reach a destination in an energy-efficient manner, e.g., using the least amount of fuel and/or electricity. One or more driving modes may be specialized in other targets for operating vehicle 100, and/or combinations of different targets. For example, a particular driving mode may be neither optimized for the fastest arrival at a destination, nor for the most energy-efficient operation, but rather for a different target.

In some implementations, different specializations may correspond to different types of operation that are included or excluded from certain driving modes. For example, the specialization of reaching a destination as fast as possible may include high levels of acceleration, and high levels of deceleration. For example, the specialization of energy-efficient operation may include high levels of acceleration, but may not include high levels of deceleration. In some implementations, certain types of operation may be included or excluded based on the presence or absence of other nearby vehicles. In some implementations, certain types of operation may be included or excluded based on whether nearby vehicles are manually operated or autonomously operated.

Mode selection component 114 may be configured to select a driving mode by verifying whether one or more determinations (e.g., by other instruction components) indicate the first driving mode is available for selection, or else, selecting a driving mode that is not the first driving mode. In some implementations, operation of mode selection component 114 may be responsive to external control information indicating one or more vehicles within the particular proximity of vehicle 100 are currently under autonomous control.

Vehicle control component 116 may be configured to control the vehicle autonomously in accordance with a selected driving mode.

External passenger component 118 may be configured to obtain and/or determine information regarding other, external passengers, e.g., passengers not present in vehicle 100. In some implementations, external passenger component 118 may be configured to obtain and/or determine external passenger presence information that indicates whether any passengers are present in one or more vehicles within a particular proximity of vehicle 100. In some implementations, obtaining the external passenger presence information may be accomplished through vehicle-to-vehicle communication. In some implementations, obtaining the external passenger presence information may be accomplished through analysis of the visual information. For example, sensors 108 of vehicle 100 may include image sensors configured to capture visual information of the exterior of vehicle 100. External passenger component 118 may be configured to analyze the captured visual information to determine whether any passengers are present in one or more vehicles within a particular proximity of vehicle 100. In some situations, external passenger component 118 may be unable to determine whether any passengers are present in other vehicles. In such a situation, the external passenger presence information may represent an unknown value or status. In some implementations, external passenger component 118 may be configured to estimate and/or assume one or more passengers are present in other vehicles responsive to the external passenger presence information having an unknown value or status.

External control component 120 may be configured to obtain and/or determine information regarding other vehicles than vehicle 100. In some implementations, external control component 120 may be configured to obtain and/or determine external control information that indicates whether one or more vehicles within a particular proximity of vehicle 100 are currently under autonomous control. In some implementations, obtaining the external control information may be accomplished through vehicle-to-vehicle communication. In some implementations, external control component 120 may be configured to analyze captured visual information to determine whether one or more vehicles within a particular proximity of vehicle 100 are currently under autonomous control. In some situations, external control component 120 may be unable to determine whether other vehicles are currently under autonomous control. In such a situation, the external control information may represent an unknown value or status. In some implementations, external control component 120 may be configured to estimate and/or assume one or more other vehicles are currently not under autonomous control responsive to the external control information having an unknown value or status. In some implementations, external passenger component 118 and/or external control component 120 may be configured to estimate and/or assume one or more passengers are present in other vehicles responsive to the external control information having an unknown value or status.

Referring to FIG. 1, user input component 122 may be configured to facilitate user input from one or more passengers. For example, user input component 122 may be configured to receive user input through a user interface in vehicle 100. In some implementations, the user input may pertain to a desired, selected, and/or otherwise requested driving mode, including but not limited to the first driving mode of vehicle 100. The operation of other components of vehicle 100, including but not limited to mode selection component 114, may be based, at least in part, on user input received through user input component 122.

In some implementations, server(s) 102, client computing platform(s) 104, and/or external resources 123 may be operatively linked via one or more electronic communication links. In some implementations, external resources 123 may provide information regarding weather, road surface conditions, traffic conditions, road closures, and/or other conditions external to vehicle 100. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 123 may be operatively linked via some other communication media.

A given client computing platform 104 may include one or more processors configured to execute computer program components. For example, in some implementations, other vehicles may be considered as client computing platforms. The computer program components may be configured to enable an expert or user associated with the given client computing platform 104 to interface with vehicle 100 and/or external resources 123, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, a vehicle, and/or other computing platforms.

External resources 123 may include sources of information outside of vehicle 100, external entities participating with vehicle 100, external servers, and/or other resources. In some implementations, some or all of the functionality attributed herein to external resources 123 may be provided by resources included in vehicle 100.

Server(s) 102 may include electronic storage 124, one or more processors 126, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 124 may comprise non-transitory storage media that electronically stores information. The electronic storage media of electronic storage 124 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 124 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 124 may include one or more virtual storage resources (e.g., cloud storage, a virtual private network, and/or other virtual storage resources). Electronic storage 124 may store software algorithms, information determined by processor(s) 126, information received from server(s) 102, information received from client computing platform(s) 104, and/or other information that enables server(s) 102 to function as described herein.

Processor(s) 126 may be configured to provide information processing capabilities in server(s) 102. As such, processor(s) 126 may include one or more of a digital processor, an analog processor, a digital circuit designed to process information, an analog circuit designed to process information, a state machine, and/or other mechanisms for electronically processing information. Although processor(s) 126 is shown in FIG. 1 as a single entity, this is for illustrative purposes only. In some implementations, processor(s) 126 may include a plurality of processing units. These processing units may be physically located within the same device, or processor(s) 126 may represent processing functionality of a plurality of devices operating in coordination. Processor(s) 126 may be configured to execute components 110, 112, 114, 116, 118, 120, and/or 122, and/or other components. Processor(s) 126 may be configured to execute components 110, 112, 114, 116, 118, 120, and/or 122, and/or other components by software; hardware; firmware; some combination of software, hardware, and/or firmware; and/or other mechanisms for configuring processing capabilities on processor(s) 126. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 110, 112, 114, 116, 118, 120, and/or 122 are illustrated in FIG. 1 as being implemented within a single processing unit, in implementations in which processor(s) 126 includes multiple processing units, one or more of components 110, 112, 114, 116, 118, 120, and/or 122 may be implemented remotely from the other components. The description of the functionality provided by the different components 110, 112, 114, 116, 118, 120, and/or 122 described below is for illustrative purposes, and is not intended to be limiting, as any of components 110, 112, 114, 116, 118, 120, and/or 122 may provide more or less functionality than is described. For example, one or more of components 110, 112, 114, 116, 118, 120, and/or 122 may be eliminated, and some or all of its functionality may be provided by other ones of components 110, 112, 114, 116, 118, 120, and/or 122. As another example, processor(s) 126 may be configured to execute one or more additional components that may perform some or all of the functionality attributed below to one of components 110, 112, 114, 116, 118, 120, and/or 122.

Figure 2:
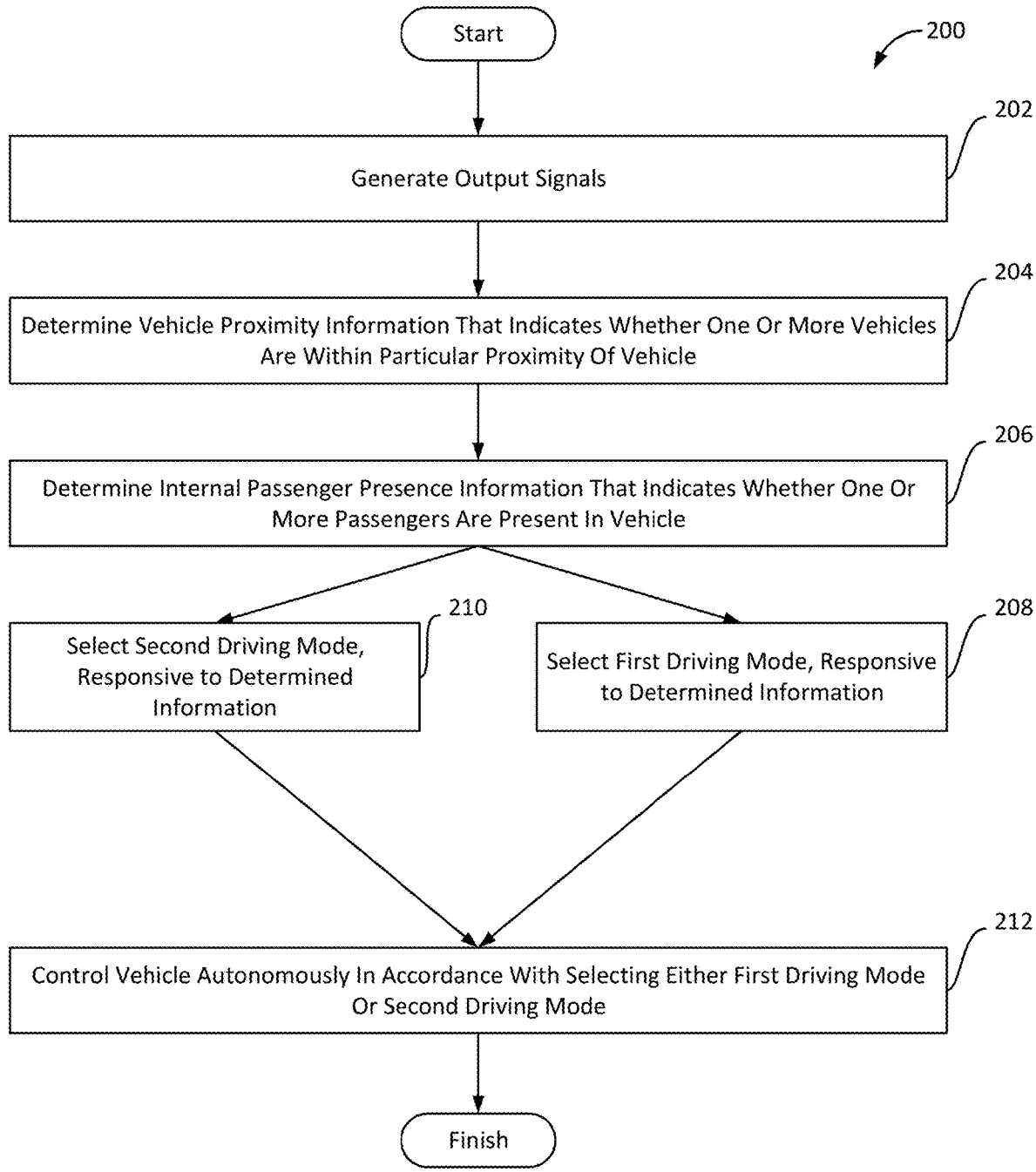
FIG. 2 includes a flow chart of a method for selecting among different driving modes for autonomous driving of a vehicle, in accordance with one or more implementations.

FIG. 2 illustrates a method 200 for selecting among different driving modes for autonomous driving of a vehicle, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include generating output signals. The output signals may convey vehicle proximity information and internal passenger presence information. The vehicle proximity information may indicate whether one or more vehicles are within a particular proximity of the vehicle. The internal passenger presence information may indicate whether one or more passengers are present in the vehicle. Operation 202 may be performed by one or more sensors that are the same as or similar to sensor(s) 108, in accordance with one or more implementations.

An operation 204 may include determining the vehicle proximity information that indicates whether one or more vehicles are within the particular proximity of the vehicle. Determination of the vehicle proximity information may be based on the output signals. Operation 204 may be performed by one or more hardware processors configured by machine-readable instructions including a component that is the same as or similar to vehicle proximity determination component 110, in accordance with one or more implementations.

An operation 206 may include determining the internal passenger presence information that indicates whether one or more passengers are present in the vehicle. Determination of the internal passenger presence information may be based on the output signals. Operation 206 may be performed by one or more hardware processors configured by machine-readable instructions including a component that is the same as or similar to passenger presence determination component 112, in accordance with one or more implementations. Based on the determined information from operations 204 and/or 206, method 200 may continued either at operation 208 or operation 210.

An operation 208 may include selecting a first driving mode. Selecting the first driving mode may be responsive to the vehicle proximity information indicating no vehicles are within the particular proximity of the vehicle and the internal passenger presence information indicating no passengers are present in the vehicle. Operation 208 may be performed by one or more hardware processors configured by machine-readable instructions including a component that is the same as or similar to mode selection component 114, in accordance with one or more implementations. In some implementations, operation 208 may be skipped, depending on the determined information. Method 200 may continue at operation 212.

An operation 210 may include selecting a second driving mode. Selecting the second driving mode may be responsive to one or more of the vehicle proximity information indicating one or more vehicles are within the particular proximity of the vehicle. The internal passenger presence information may indicate one or more passengers are present in the vehicle. The first driving mode may be different than the second driving mode. The first driving mode may be more energy-efficient than the second driving mode and/or the first driving mode saves driving time compared to the second driving mode. Operation 210 may be performed by one or more hardware processors configured by machine-readable instructions including a component that is the same as or similar to mode selection component 114, in accordance with one or more implementations. In some implementations, operation 210 may be skipped, depending on the determined information. Method 200 may continue at operation 212.

An operation 212 may include controlling the vehicle autonomously in accordance with selection of either the first driving mode or the second driving mode. Operation 212 may be performed by one or more hardware processors configured by machine-readable instructions including a component that is the same as or similar to vehicle control component 116, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation. Thus, the breadth and scope of the technology disclosed herein should not be limited by any of the above-described exemplary implementations.

Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent component names other than those depicted herein can be applied to the various partitions. Additionally, with regard to flow charts, operational descriptions and method claims, the order in which the steps are presented herein shall not mandate that various implementations be implemented to perform the recited functionality in the same order unless the context dictates otherwise.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of words and phrases such as "one or more," "at least," "but not limited to" or other like phrases in some instances shall not be read to mean that the narrower case is intended or required in instances where such phrases may be absent. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various implementations set forth herein are described in terms of exemplary block diagrams, flow charts and other illustrations. As will become apparent to one of ordinary skill in the art after reading this document, the illustrated implementations and their various alternatives can be implemented without confinement to the illustrated examples. For example, block diagrams and their accompanying description should not be construed as mandating a particular architecture or configuration.

What is claimed is:

1. A vehicle configured to select among different driving modes for autonomous driving of the vehicle, the vehicle comprising:
    a set of sensors sensing vehicle proximity information indicating whether one or more vehicles are within a threshold distance from the vehicle;
    one or more hardware processors configured by machine-readable instructions to:
        select a first driving mode, wherein selecting the first driving mode is responsive to the vehicle proximity information indicating no vehicles are within the threshold distance from the vehicle;
        select a second driving mode responsive to the vehicle proximity information indicating one or more vehicles are within the threshold distance from the vehicle, wherein the first driving mode is at least one of more energy-efficient than the second driving mode and results in shortened driving time compared to that resulting from selection of the second driving mode; and
        control the vehicle autonomously in accordance with selection of either the first driving mode or the second driving mode.

2. The vehicle of claim 1, wherein the set of sensors is further configured to generate output signals conveying internal passenger presence information, wherein the internal passenger presence information indicates whether one or more passengers are present in the vehicle, and wherein the one or more hardware processors are further configured by machine-readable instructions to:
    determine the internal passenger presence information that indicates whether one or more passengers are present in the vehicle, wherein determination of the internal passenger presence information is based on the output signals;
    wherein selecting the first driving mode is further responsive to the internal passenger presence information indicating no passengers are present in the vehicle;

wherein selecting the second driving mode is responsive to the internal passenger presence information indicating one or more passengers are present in the vehicle.

3. The vehicle of claim 1, wherein the one or more hardware processors are further configured by machine-readable instructions to:
obtain external passenger presence information that indicates whether any passengers are present in one or more vehicles within the threshold distance from the vehicle, responsive to the vehicle proximity information indicating the one or more vehicles are within the threshold distance from the vehicle;
select the first driving mode, wherein selecting the first driving mode is responsive to the external passenger presence information indicating no passengers are present in the one or more vehicles within the threshold distance from the vehicle; and
select the second driving mode, wherein selecting the second driving mode is responsive to the external passenger presence information indicating passengers are present in the one or more vehicles within the threshold distance from the vehicle.

4. The vehicle of claim 1, wherein the one or more hardware processors are further configured by machine-readable instructions to:
obtain external control information that indicates whether one or more vehicles within the particular proximity of the vehicle are currently under autonomous control, responsive to the vehicle proximity information indicating the one or more vehicles are within the threshold distance from the vehicle;
select the first driving mode, wherein selecting the first driving mode is responsive to the external control information indicating the one or more vehicles within the threshold distance from the vehicle are currently under autonomous control; and
select the second driving mode, wherein selecting the second driving mode responsive to the external control information indicating at least one of the one or more vehicles within the threshold distance from the vehicle are currently not under autonomous control.

5. The vehicle of claim 1, wherein the first driving mode allows a higher level of acceleration than a maximum level of acceleration allowed while the vehicle is operating in the second driving mode.

6. The vehicle of claim 1, wherein the first driving mode allows a higher level of deceleration than a maximum level of deceleration allowed while the vehicle is operating in the second driving mode.

7. The vehicle of claim 3, wherein the first driving mode allows a smaller following distance to another vehicle than a minimum following distance allowed while the vehicle is operating in the second driving mode.

8. The vehicle of claim 3, wherein obtaining the external passenger presence information is accomplished through vehicle-to-vehicle communication.

9. The vehicle of claim 3, wherein the output signals further convey visual information regarding an exterior of the vehicle, and wherein obtaining the external passenger presence information is accomplished through analysis of the visual information.

10. The vehicle of claim 1, wherein the one or more physical computer processors are further configured by computer-readable instructions to:
facilitate user input from one or more passengers, wherein the user input represents a request for selection of the first driving mode;
select the first driving mode, wherein selection is based on the user input.

11. A method for selecting among different driving modes for autonomous driving of a vehicle, the method comprising:
generating output signals conveying vehicle proximity information indicating whether one or more vehicles are within a threshold distance from the vehicle;
selecting a first driving mode responsive to the vehicle proximity information indicating no vehicles are within the threshold distance from;
selecting a second driving mode responsive to the vehicle proximity information indicating one or more vehicles are within the threshold distance from the vehicle, wherein the first driving mode is at least one of more energy-efficient than the second driving mode and results in shortened driving time compared to that resulting from selection of the second driving mode; and
controlling the vehicle autonomously in accordance with selecting either the first driving mode or the second driving mode.

12. The method of claim 11, wherein the output signals further convey internal passenger presence information, wherein the internal passenger presence information indicates whether one or more passengers are present in the vehicle, the method further comprising:
determining the internal passenger presence information that indicates whether one or more passengers are present in the vehicle, wherein determination of the internal passenger presence information is based on the output signals;
wherein selecting the first driving mode is further responsive to the internal passenger presence information indicating no passengers are present in the vehicle; and
wherein selecting the second driving mode is responsive to the internal passenger presence information indicating one or more passengers are present in the vehicle.

13. The method of claim 11, further comprising:
obtaining external passenger presence information that indicates whether any passengers are present in one or more vehicles within the particular proximity of the vehicle, responsive to the vehicle proximity information indicating the one or more vehicles are within the threshold distance from the vehicle;
selecting the first driving mode, wherein selecting the first driving mode is responsive to the external passenger presence information indicating no passengers are present in the one or more vehicles within the threshold distance from the vehicle; and
selecting the second driving mode, wherein selecting the second driving mode is responsive to the external passenger presence information indicating passengers are present in the one or more vehicles within the threshold distance from the vehicle.

14. The method of claim 11, further comprising:
obtaining external control information that indicates whether one or more vehicles within the threshold distance from the vehicle are currently under autonomous control, responsive to the vehicle proximity information indicating the one or more vehicles are within the threshold distance from the vehicle;
selecting the first driving mode, wherein selecting the first driving mode is responsive to the external control information indicating the one or more vehicles within the threshold distance from the vehicle are currently under autonomous control; and selecting the second driving mode, wherein selecting the second driving mode responsive to the external control information indicating at least one of the one or more vehicles within the particular proximity of the vehicle are currently not under autonomous control.

15. The method of claim 11, wherein the first driving mode allows a higher level of acceleration than a maximum level of acceleration allowed while the vehicle is operating in the second driving mode.

16. The method of claim 11, wherein the first driving mode allows a higher level of deceleration than a maximum level of deceleration allowed while the vehicle is operating in the second driving mode.

17. The method of claim 13, wherein the first driving mode allows a smaller following distance to another vehicle than a minimum following distance allowed while the vehicle is operating in the second driving mode.

18. The method of claim 13, wherein obtaining the external passenger presence information is accomplished through vehicle-to-vehicle communication.

19. The method of claim 13, wherein the output signals further convey visual information regarding an exterior of the vehicle, and wherein obtaining the external passenger presence information is accomplished through analysis of the visual information.

20. The method of claim 11, further comprising:
facilitating user input from one or more passengers;
selecting the first driving mode, wherein selection is based on the user input.

* * * * *